US012762244B2

(12) United States Patent
Han

(10) Patent No.: US 12,762,244 B2
(45) Date of Patent: Oct. 13, 2026

(54) SERVER STARTUP MANAGEMENT SYSTEM AND METHOD

(71) Applicant: SUZHOU METABRAIN INTELLIGENT TECHNOLOGY CO., LTD., Suzhou (CN)

(72) Inventor: Hongrui Han, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 103 days.

(21) Appl. No.: 18/879,672

(22) PCT Filed: Dec. 21, 2023

(86) PCT No.: PCT/CN2023/140755
§ 371 (c)(1),
(2) Date: Dec. 27, 2024

(87) PCT Pub. No.: WO2024/149044
PCT Pub. Date: Jul. 18, 2024

(65) Prior Publication Data
US 2025/0390581 A1 Dec. 25, 2025

(30) Foreign Application Priority Data
Jan. 9, 2023 (CN) ......................... 202310023973.6

(51) Int. Cl.
*G11C 29/00* (2006.01)
*G06F 21/56* (2013.01)
*G06F 21/57* (2013.01)

(52) U.S. Cl.
CPC .......... *G06F 21/575* (2013.01); *G06F 21/568* (2013.01); *G06F 21/577* (2013.01)

(58) Field of Classification Search
None
See application file for complete search history.

(56) References Cited

U.S. PATENT DOCUMENTS 10,239,080 B2 * 3/2019 Charcosset ........... B05B 9/0423
2018/0144135 A1 5/2018 Rihan et al.
(Continued)

FOREIGN PATENT DOCUMENTS

CN 101635019 A 1/2010
CN 109889477 A 6/2019
(Continued)

OTHER PUBLICATIONS

"M. Sarikonda and S. R, "Validation of Firmware Security using Fuzzing and Penetration Methodologies," 2022 IEEE North Karnataka Subsection Flagship International Conference (NKCon), Vijaypur, India, 2022, pp. 1-5, doi: 10.1109/NKCon56289.2022.10126524." (Year: 2022).*

(Continued)

*Primary Examiner* — Christopher B Robinson
(74) *Attorney, Agent, or Firm* — Merchant & Gould P.C.

(57) ABSTRACT

The present disclosure relates to the technical field of servers. Provided are a server startup management system and method. The system comprises: an MCU, a storage module, a BMC, and a CPU. The MCU is configured to control running and stopping of the BMC and the CPU, and the MCU verifies at least one of the BMC and the CPU, reads firmware data in the storage module, and obtains a security verification result and a vulnerability verification result; the storage module is configured to store the firmware data; and at least one of the BMC and the CPU is configured to start up normally on the basis of the security verification result of the MCU, or to prohibit startup on the basis of the vulnerability verification result of the MCU.

20 Claims, 6 Drawing Sheets

(56) References Cited

U.S. PATENT DOCUMENTS

| | | | | |
|---|---|---|---|---|
| 2020/0012501 | A1* | 1/2020 | Suryanarayana | G06F 21/52 |
| 2021/0152543 | A1* | 5/2021 | Doshi | G06N 20/00 |
| 2022/0398320 | A1* | 12/2022 | Maddukuri | G06F 21/572 |
| 2023/0401321 | A1* | 12/2023 | Moshe | G06F 16/1837 |
| 2024/0037242 | A1* | 2/2024 | Suryanarayana | G06F 21/566 |
| 2024/0129194 | A1* | 4/2024 | Mueck | G06F 21/16 |
| 2024/0143768 | A1* | 5/2024 | Kondapi | G06F 21/572 |
| 2024/0169049 | A1* | 5/2024 | Hamlin | G06F 21/44 |

FOREIGN PATENT DOCUMENTS

| | | | |
|---|---|---|---|
| CN | 110764486 | A | 2/2020 |
| CN | 111399919 | A | 7/2020 |
| CN | 111708578 | A | 9/2020 |
| CN | 114116276 | A | 3/2022 |
| CN | 114428963 | A | 5/2022 |
| CN | 114444083 | A | 5/2022 |
| CN | 114780319 | A | 7/2022 |
| CN | 115329321 | A | 11/2022 |
| CN | 115729647 | A | 3/2023 |

OTHER PUBLICATIONS

"C. Gao, L. Luo, Y. Zhang, B. Pearson and X. Fu, "Microcontroller Based IT System Firmware Security: Case Studies," 2019 IEEE International Conference on Industrial Internet (ICII), Orlando, FL, USA, 2019, pp. 200-209, doi: 10.1109/ICII.2019.00045." (Year: 2019).*

International Search Report for PCT/CN2023/140755 dated Feb. 6, 2024 (10 pages), with English translation of Search Report.

Chinese search report part 1 received for CN Application No. 2023100239736, received Dec. 19, 2024, 2 pgs.

Chinese search report part 2 received for CN Application No. 2023100239736, received Dec. 19, 2024, 1 pgs.

* cited by examiner

SERVER STARTUP MANAGEMENT SYSTEM AND METHOD

CROSS-REFERENCE TO RELATED APPLICATION

The present disclosure is a National Stage Application of PCT/CN2023/140755, filed on Dec. 21, 2023, which claims the priority to Chinese Patent Application No. 202310023973.6, filed to the China National Intellectual Property Administration on Jan. 9, 2023 and entitled "Server Startup Management System and Method", which is incorporated herein by reference in its entirety.

TECHNICAL FIELD

The present disclosure relates to the technical field of servers, and in particular, to a server startup management system and method.

BACKGROUND

With the rapid development of Internet technologies, cloud services and cloud computing are booming, and more and more servers are deployed. The servers are not limited to a fixed machine room in the past, and present multi-place multi-center distributed deployment. An operation and maintenance management network of the servers inevitably needs to be connected to the Internet for unified management. The current network environment is more complex, and the situation of virus and hacker intrusion and destruction is becoming more prominent. A BMC (Baseboard Management Controller) plays a role of system management in a server, and is also a weak link. An BMC firmware update is usually slow, so that many of the latest security policies and security patches are missing or not updated in time. As a result, the BMS is easily compromised, and a malicious illegitimate firmware can even be flashed, bypassing the current security measures, thereby seriously affecting the normal operation of a computer system and the security of a server system.

Aiming at the problems in the related art, such as how to ensure secure startup of a server, no effective solution has been proposed.

SUMMARY

Some embodiments of the present disclosure provide a server startup management system and method.

According to a first aspect, some embodiments of the present disclosure provide a server startup management system, comprising:

- a Micro-Controller Unit (MCU), a storage module, a Baseboard Management Controller (BMC) and a Central Processing Unit (CPU);
- the MCU is configured to control running and stopping of the BMC and the CPU, and the MCU verifies at least one of the BMC and the CPU, reads firmware data in the storage module, and obtains a security verification result or a vulnerability verification result;
- the storage module is configured to store firmware data of the BMC and firmware data of the CPU; and
- at least one of the BMC and the CPU is configured to start up normally on the basis of the security verification result of the MCU, or to prohibit startup on the basis of the vulnerability verification result of the MCU.

According to the server startup management system provided in some embodiments of the present disclosure, the storage module comprises first storage firmware and second storage firmware; and

- the first storage firmware is configured to store the firmware data of the BMC, and the second storage firmware is configured to store the firmware data of the CPU.

According to the server startup management system provided in some embodiments of present disclosure, the MCU can be configured to:

- read firmware data of the first storage firmware and firmware data of the second storage firmware;
- determine that a verification result corresponding to the first storage firmware is the security verification result, and determine that the first storage firmware is secure firmware, or determine that a verification result corresponding to the second storage firmware is the security verification result, and determine that the second storage firmware is secure firmware;
- determine that the verification result corresponding to the second storage firmware is the vulnerability verification result, and determine that the second storage firmware is vulnerable firmware, or determine that the verification result corresponding to the first storage firmware is the vulnerability verification result, and determine that the first storage firmware is vulnerable firmware; and
- synchronize the secure firmware into the vulnerable firmware.

According to the server startup management system provided in some embodiments of present disclosure, the system further comprises a gating module; and

- the gating module is configured to control a connection between the MCU and the first storage firmware, or a connection between the MCU and the second storage firmware.

According to the server startup management system provided in some embodiments of present disclosure, the gating module comprises a dual control port; and

- the gating module is configured to, on the basis of a switching logic, enable the MCU to be connected to the first storage firmware and the second storage firmware through the dual control port.

According to the server startup management system provided in some embodiments of present disclosure, the BMC is connected to the first storage firmware or the second storage firmware on the basis of a Serial Peripheral Interface (SPI) bus, and the MCU is connected to the first storage firmware or the second storage firmware on the basis of the SPI bus.

According to the server startup management system provided in some embodiments of present disclosure, the BMC switches, on the basis of a first Chip Select (CS) signal, connection between the BMC and the first storage firmware or the second storage firmware; and the MCU switches, on the basis of a second Chip Select (CS) signal, a connection between the MCU and the first storage firmware, or a connection between the MCU and the second storage firmware.

According to the server startup management system provided in some embodiments of present disclosure, the MCU is further configured to:

- after a server is powered on, clamp Reset pins of the BMC and the CPU on the basis of Reset signals, and prevent the BMC and the CPU from starting up;
- obtain the security verification result after firmware check or update of the BMC and the CPU is successful; and release the Reset pins of the BMC and the CPU on the basis of the security verification result, such that the BMC and the CPU start up normally.

According to the server startup management system provided in some embodiments of present disclosure, the MCU is further configured to:

in cases where verification results corresponding to the first storage firmware and the second storage firmware are both the vulnerability verification result, determine whether a disaster recovery startup option is set; and in cases where the disaster recovery startup is not set, maintain clamping of the Reset signals on the Reset pins of the BMC and the CPU, and record a system log and give a buzzer alarm.

According to the server startup management system provided in some embodiments of present disclosure, the MCU is further configured to:

in cases where the disaster recovery startup is set, clear the first storage firmware corresponding to the BMC and the second storage firmware corresponding to the CPU; and refresh emergency startup firmware into the first storage firmware or the second storage firmware, such that the BMC or the CPU starts up the emergency startup firmware.

According to the server startup management system provided in some embodiments of present disclosure, the BMC or the CPU is further configured to:

after the emergency startup firmware is started up, download new BMC firmware or new CPU firmware from a target address, such that the MCU determines security of the BMC firmware or the CPU firmware; and upon determining that the BMC firmware or the CPU firmware is secure, refresh the first storage firmware or the second storage firmware, obtain an update completion notification and send same to the MCU.

According to the server startup management system provided in some embodiments of present disclosure, the MCU receives the update completion notification of the BMC or the CPU on the basis of an Inter-Integrated Circuit (I2C) bus.

According to the server startup management system provided in some embodiments of present disclosure, the MCU is configured to: on the basis of a set encryption and decryption algorithm and an unmodifiable security key stored in a key region, perform encryption and decryption calculation on the firmware data of the storage module to obtain a security check value, and compare calculated security check value with a security check value stored in the storage module to obtain a matching result; in a case that the matching is successful, generate the security verification result; and in a case that the matching is unsuccessful, generate the vulnerability verification result.

According to the server startup management system provided in some embodiments of present disclosure, the MCU is further configured to: enable a program of the MCU to be unmodifiable by means of a security key obtained through firmware burning; and destroy illegitimate malicious firmware, and perform emergency startup of the server on the basis of disaster recovery startup, and perform automatic recovery of legitimate secure firmware on the basis of emergency firmware.

According to the server startup management system provided in some embodiments of present disclosure, the MCU is further configured to: perform a first verification on integrity and legitimacy of the BMC, in a case that the first verification is successful, release Reset signal of the BMC, such that the BMC starts up securely, control a CPU link gate to connect a Flash to the MCU, and perform a second verification on integrality and legitimacy of Basic Input Output System (BIOS) firmware, in a case of the second verification is failed, notify the BMC to restore the BIOS firmware, and in a case that restoration of the BIOS firmware is completed, enable the CPU to start up securely.

According to a second aspect, some embodiments of the present disclosure further provide a server startup management method, comprising:

an MCU verifies at least one of a BMC and a CPU, reads firmware data in a storage module, and obtains a security verification result or a vulnerability verification result; and the MCU controls normal startup at least one of the BMC and the CPU on the basis of the security verification result, or prohibits normal startup at least one of the BMC and the CPU on the basis of the vulnerability verification result.

According to the server startup management method provided in some embodiments the present disclosure, the storage module comprises first storage firmware and second storage firmware; and the method further comprises:

firmware data of the first storage firmware and firmware data of the second storage firmware are read;

it is determined that a verification result corresponding to the first storage firmware is the security verification result, and it is determined that the first storage firmware is secure firmware, or it is determined that a verification result corresponding to the second storage firmware is the security verification result, and it is determined that the second storage firmware is secure firmware;

it is determined that the verification result corresponding to the second storage firmware is the vulnerability verification result, and it is determined that the second storage firmware is vulnerable firmware, or it is determined that the verification result corresponding to the first storage firmware is the vulnerability verification result, and it is determined that the first storage firmware is vulnerable firmware; and the secure firmware is synchronized into the vulnerable firmware.

According to the server startup management method provided in some embodiments the present disclosure, the method further comprises:

in cases where the verification results corresponding to the first storage firmware and the second storage firmware are both the vulnerability verification result, whether a disaster recovery startup option is set is determined;

in cases where disaster recovery startup is not set, clamping of Reset signals on Reset pins of the BMC and the CPU is maintained, and a system log is recorded and a buzzer alarm is given;

in cases where disaster recovery startup is set, the first storage firmware corresponding to the BMC and the second storage firmware corresponding to the CPU are cleared; and emergency startup firmware is refreshed into the first storage firmware or the second storage firmware, such that the BMC or the CPU starts up the emergency startup firmware.

According to the server startup management method provided in some embodiments the present disclosure, before the MCU verifies at least one of the BMC and the CPU, the method further comprises:

after a server is powered on, the Reset pins of the BMC and the CPU are clamped on the basis of the Reset signals, and the BMC and the CPU are prevented from starting up;

According to the server startup management method provided in some embodiments the present disclosure, the MCU controlling normal startup at least one of the BMC and the CPU on the basis of the security verification result comprises:

the security verification result is obtained after firmware check or update of the BMC and the CPU is successful; and the Reset pins of the BMC and the CPU are released on the basis of the security verification result, such that the BMC and the CPU start up normally.

According to the server startup management method provided in some embodiments the present disclosure, the MCU is configured to: on the basis of a set encryption and decryption algorithm and an unmodifiable security key stored in a key region, perform encryption and decryption calculation on the firmware data of the storage module to obtain a security check value, and compare calculated security check value with a security check value stored in the storage module to obtain a matching result; in a case that the matching is successful, generate the security verification result; and in a case that the matching is unsuccessful, generate the vulnerability verification result.

According to the server startup management method provided in some embodiments the present disclosure, the MCU is further configured to: enable a program of the MCU to be unmodifiable by means of a security key obtained through firmware burning; and destroy illegitimate malicious firmware, and perform emergency startup of the server on the basis of disaster recovery startup, and perform automatic recovery of legitimate secure firmware on the basis of emergency firmware.

According to the server startup management method provided in some embodiments the present disclosure, the MCU is further configured to: perform a first verification on integrity and legitimacy of the BMC, in a case that the first verification is successful, release Reset signal of the BMC, such that the BMC starts up securely, control a CPU link gate to connect a Flash to the MCU, and perform a second verification on integrality and legitimacy of Basic Input Output System (BIOS) firmware, in a case of the second verification is failed, notify the BMC to restore the BIOS firmware, and in a case that restoration of the BIOS firmware is completed, enable the CPU to start up securely.

According to a third aspect, some embodiments of the present disclosure further provide an electronic device, comprising a memory, a processor, and a computer program stored on the memory and capable of running on the processor. The program, when being executed by the processor, implements the server startup management method according to any one of the embodiments above.

According to a fourth aspect, some embodiments of the present disclosure further provide a non-transitory readable storage medium. The non-transitory readable storage medium stores a computer program which, when being executed by a processor, implements the server startup management method according to any one of the embodiments above.

According to a fifth aspect, some embodiments of the present disclosure further provide a computer program product. The computer program product comprises a computer program which, when being executed by a processor, implements the server startup management method according to any one of the embodiments above.

According to the server startup management system provided in some embodiments of the present disclosure, an MCU verifies at least one of a BMC and a CPU, reads firmware data in a storage module, and obtains a security verification result and a vulnerability verification result; and the MCU clamps normal startup at least one of the BMC and the CPU on the basis of the security verification result, or prohibits normal startup at least one of the BMC and the CPU on the basis of the vulnerability verification result.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description relate to some embodiments of the present disclosure, and for a person of ordinary skill in the art, other embodiments can also be derived from these accompanying drawings without involving any inventive effort.

DETAILED DESCRIPTION OF THE EMBODIMENTS

To make the objects, technical solutions and advantages of the embodiments of the present disclosure clearer, hereinafter, the technical solutions in the embodiments of the present disclosure will be described clearly and thoroughly with reference to the accompanying drawings of the embodiments of the present disclosure. Obviously, the embodiments as described are some of the embodiments of the present disclosure, and are not all of the embodiments. All other embodiments obtained by a person of ordinary skill in the art on the basis of the embodiments of the present disclosure without involving any inventive effort shall all fall within the scope of protection of some embodiments of the present disclosure.

Figure 1:
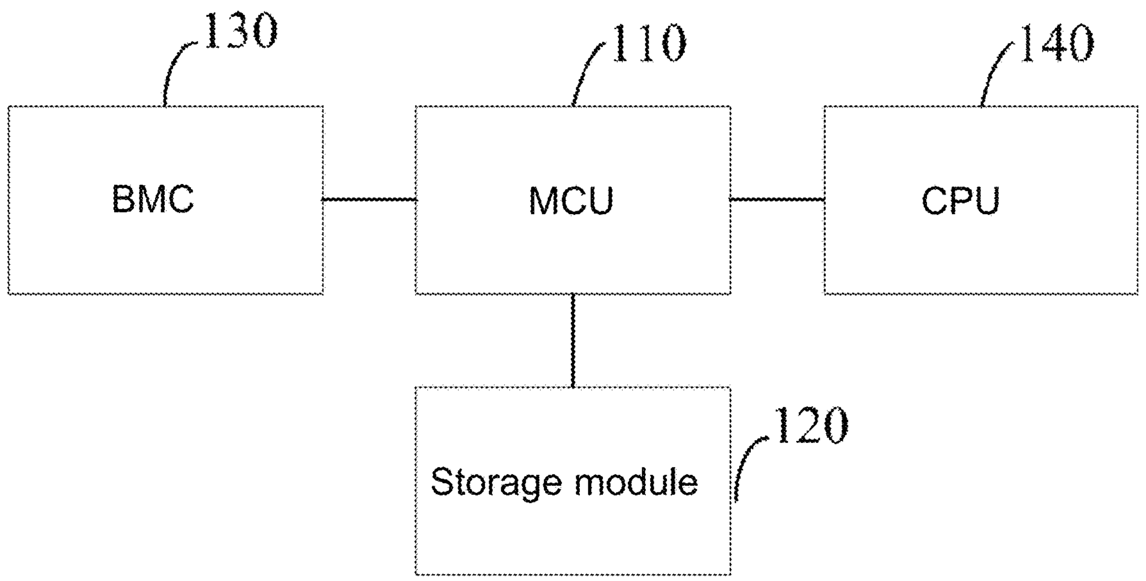
FIG. 1 is a first schematic structural diagram of a server startup management system provided according to embodiments of the present disclosure.

Referring to FIG. 1, the server startup management system provided in some embodiments of the present disclosure comprises, but is not limited to, the following modules:

- an MCU 110, a storage module 120, a BMC 130, and a CPU (Central Processing Unit) module 140;
- the MCU 110 is configured to control running and stopping of the BMC 130 and the CPU 140, and the MCU 110 verifies at least one of the BMC 130 and the CPU 140, reads firmware data in the storage module 120, and obtains a security verification result or a vulnerability verification result;
- the storage module 120 is configured to store firmware data of the BMC 130 and firmware data of the CPU 140; and
- at least one of the BMC 130 and the CPU 140 is configured to start up normally on the basis of the security verification result of the MCU 110, or to prohibit startup on the basis of the vulnerability verification result of the MCU 110.

In some embodiments, the MCU in the present embodiment, i.e. a microcontroller unit, is configured to implement the server startup management system. The main functions may comprise: the function of clamping startup of the BMC and the CPU, and preventing malicious software from starting up and running. The function of checking the integrity and security of data in a Flash; a security key function; and the security key being burned with firmware and locked, so that an MCU program cannot be modified. A firmware self-healing function for providing disaster recovery startup and emergency firmware; clearing illegitimate firmware, security upgrade, and other functions.

The BMC is a central hub for entire-system monitoring, management and external interaction in a server system, and is an indispensable bridgehead in the server. The BMC has great authority and has a significant effect on the entire system, and thus the security of firmware thereof is becoming more important. Once the BMC is hacked or malicious software is run, the entire server can be hijacked and controlled.

The CPU, i.e. the central processing unit module, is a core computing unit for running an operating system and customer services.

The storage module, i.e. a storage chip, is mainly used for storing firmware data of the BMC or a BIOS (Basic Input Output System), and may use a Flash chip. In practical applications, a single Flash or dual Flashes may be used.

The MCU performs encryption and decryption calculation on the data in the storage module Flash according to a set encryption and decryption algorithm and an unmodifiable security key stored in a key region, to obtain a security check value. Then, the obtained security check value is compared with a security check value stored in the storage module Flash. If they match, it indicates that the data is complete, and a security verification result is generated. If they do not match, it indicates that the firmware is damaged or tampered with, and has a security vulnerability, and a vulnerability verification result is generated.

According to the server startup management system provided in some embodiments of the present disclosure, an MCU verifies at least one of a BMC and a CPU, reads firmware data in a storage module, and obtains a security verification result and a vulnerability verification result; and the MCU clamps normal startup at least one of the BMC and the CPU on the basis of the security verification result, or prohibits normal startup at least one of the BMC and the CPU on the basis of the vulnerability verification result. In the present disclosure, the startup of the BMC and the CPU is clamped by means of the MCU, and the secure startup of a server is realized by means of security check, thereby ensuring the normal operation of a computer system and the security of a server system.

In some embodiments, the storage module comprises first storage firmware and second storage firmware; and

- the first storage firmware is configured to store the firmware data of the BMC, and the second storage firmware is configured to store the firmware data of the CPU.

It can be understood that when the storage module uses dual Flashes, the storage module may be divided into first storage firmware denoted as Flash0, and second storage firmware denoted as Flash1. Compared with a single Flash, the dual Flashes have a slightly more complicated design and higher security, so that after firmware in one Flash is damaged, another Flash can be used for backup.

In some embodiments, the MCU can be configured to:

- read firmware data of the first storage firmware and firmware data of the second storage firmware;
- determine that a verification result corresponding to the first storage firmware is the security verification result, and determine that the first storage firmware is secure firmware, or determine that a verification result corresponding to the second storage firmware is the security verification result, and determine that the second storage firmware is secure firmware;
- determine that the verification result corresponding to the second storage firmware is the vulnerability verification result, and determine that the second storage firmware is vulnerable firmware, or determine that the verification result corresponding to the first storage firmware is the vulnerability verification result, and determine that the first storage firmware is vulnerable firmware; and
- synchronize the secure firmware into the vulnerable firmware.

In some embodiments, the MCU reads firmware data in the first storage firmware and the second storage firmware of the dual Flashes of the storage module, and if one firmware is secure, that is, the check result is a security verification result, and the other has a vulnerable check result, then synchronizes the secure firmware into the firmware which fails to pass the check.

In some embodiments, a gating module is further comprised;

- the gating module is configured to control a connection between the MCU and the first storage firmware, or a connection between the MCU and the second storage firmware.

In some embodiments, the gating module comprises a dual control port; and

- the gating module is configured to, on the basis of a switching logic, enable the MCU to be connected to the first storage firmware and the second storage firmware through the dual control port.

The gating module in the present embodiment is composed of a Switch (switch chip), which may select a corresponding switch chip, and may also be realized by a CPLD (Complex Programmable Logic Device). The present gating module has a dual control port and a switching logic for implementing that the BMC and the MCU can control gating requirements of Flashes. At the same time, it is necessary to logically avoid switching two Flashes to one channel.

In some embodiments, the BMC is connected to the first storage firmware or the second storage firmware on the basis of a Serial Peripheral Interface (SPI) bus, and the MCU is connected to the first storage firmware or the second storage firmware on the basis of the SPI bus.

In some embodiments, the BMC switches, on the basis of a first chip select CS signal (Chip Select, a control signal for selecting a specific chip), connection between the BMC and the first storage firmware or the second storage firmware; and the MCU switches, on the basis of a second Chip Select (CS) signal, a connection between the MCU and the first storage firmware, or a connection between the MCU and the second storage firmware.

In some embodiments, the MCU is further configured to:

after a server is powered on, clamp Reset pins of the BMC and the CPU on the basis of Reset signals, and prevent the BMC and the CPU from starting up;

obtain a security verification result after firmware verification or update of the BMC and the CPU is successful; and release the Reset pins of the BMC and the CPU on the basis of the security verification result, such that the BMC and the CPU start up normally.

In some embodiments, before performing firmware data check, the MCU in the present embodiment is powered on first, and clamps the startup of the MCU and the CPU by pulling down the Reset pins thereof. In this case, the MCU performs integrity and security check on the firmware of the BMC and the BIOS. After the verification succeeds, the MCU releases the corresponding Reset signals, such that the MCU and the CPU start to load firmware from the Flash for startup.

A security verification result is obtained after firmware check or update of the BMC and the CPU is successful, and the Reset pins of the BMC and the CPU are released on the basis of the security verification result, such that the BMC and the CPU start up normally.

In some embodiments, the MCU is further configured to:

in cases where verification results corresponding to the first storage firmware and the second storage firmware are both the vulnerability verification result, determine whether a disaster recovery startup option is set; and in cases where disaster recovery startup is not set, maintain clamping of the Reset signals on the Reset pins of the BMC and the CPU, and record a system log and give a buzzer alarm.

In the present embodiment, when neither the verification result of the first storage firmware Flash0 nor the verification result of the second storage firmware Flash1 is passed, that is, the verification results are both the vulnerability verification result, the MCU needs to determine whether a disaster recovery startup option is set in the system.

If the disaster recovery startup function is not enabled, the MCU maintains clamping of the reset signals of the BMC and the CPU, not allowing the system to start up, and records a log and gives a buzzer alarm at the same time.

In some embodiments, the MCU is further configured to:

in cases where disaster recovery startup is set, clear the first storage firmware corresponding to the BMC and the second storage firmware corresponding to the CPU; and refresh emergency startup firmware into the first storage firmware or the second storage firmware, such that the BMC or the CPU starts up the emergency startup firmware.

In some embodiments, the BMC or CPU can be configured to:

after the emergency startup firmware is started up, download new BMC firmware or new CPU firmware from a target address, such that the MCU determines security of the BMC firmware or the CPU firmware; and upon determining that the BMC firmware or the CPU firmware is secure, refresh the first storage firmware or the second storage firmware, obtain an update completion notification and send same to the MCU.

If the disaster recovery startup function is set, the MCU clears the firmware data in the Flash of the BMC, and then refreshes the emergency startup firmware in the MCU into the Flash, such that the BMC starts up the emergency firmware.

After the security emergency firmware is started up, the latest BMC firmware is downloaded from a specified address, and the MCU assists in verifying the security of the firmware, and after the security is confirmed, the BMC refreshes the Flash again. The MCU is notified after the update is completed.

By the same reasoning, when the BIOS firmware of the CPU fails to pass the verification, the MCU notifies the CPU to perform a security update on the BIOS firmware. The CPU downloads the corresponding BIOS firmware from a specified address, and verifies and updates the BIOS firmware, and the MCU continues to perform the process after the update is completed. Otherwise, the CPU is always clamped to prohibit startup thereof. After the BIOS firmware is verified or updated successfully, the MCU releases the Reset signal of the CPU, such that the CPU starts up securely.

It should be noted that during normal operation of the system, the MCU assists the BMC in performing a firmware security upgrade operation. The BMC sends information to the MCU to verify an upgrade package. The verification result is fed back to the BMC, and the BMC determines, according to the result, whether to update the firmware.

In some embodiments, the MCU receives the update completion notification of the BMC or the CPU on the basis of an Inter-Integrated Circuit (I2C) bus.

Figure 2:
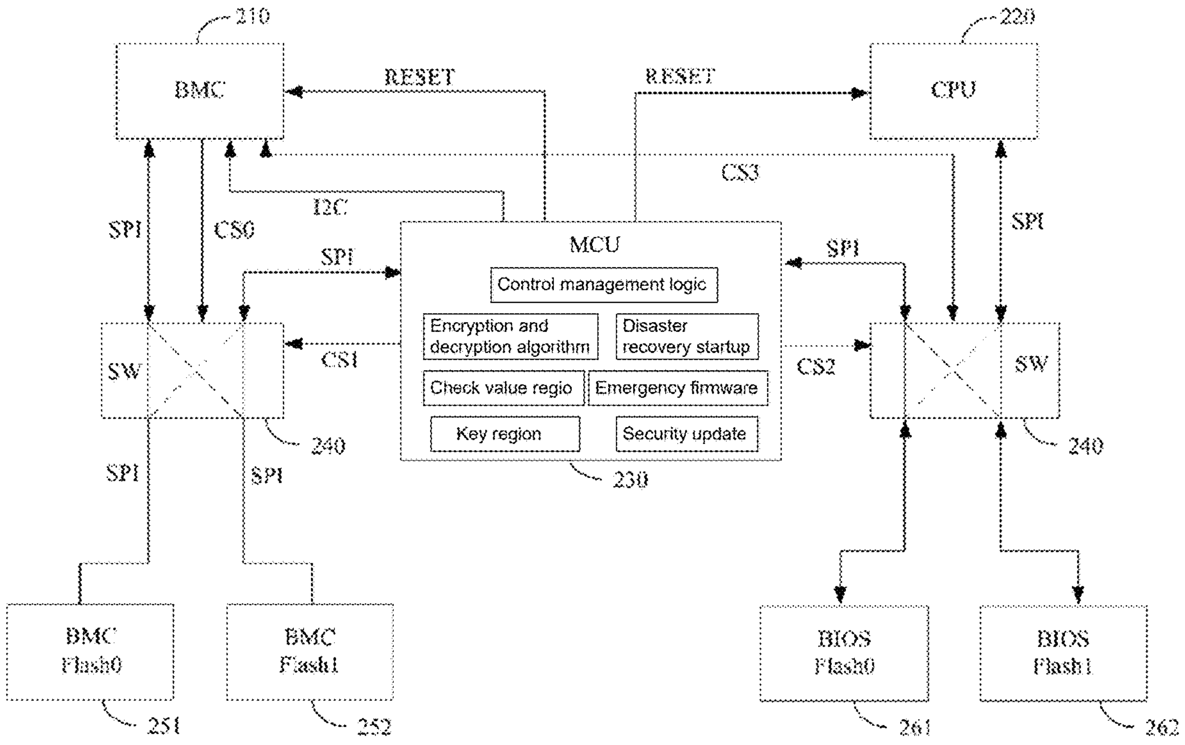
FIG. 2 is a second schematic structural diagram of a server startup management system provided according to embodiments of the present disclosure.

Referring to FIG. 2, FIG. 2 is a schematic diagram of a server startup management system with dual Flashes provided according to embodiments of the present disclosure, comprising a BMC 210, a CPU 220, an MCU 230, an SW 240, BMC Flash0 251, BMC Flash1 252, BIOS Flash0 261, and BIOS Flash1 262.

Figure 3:
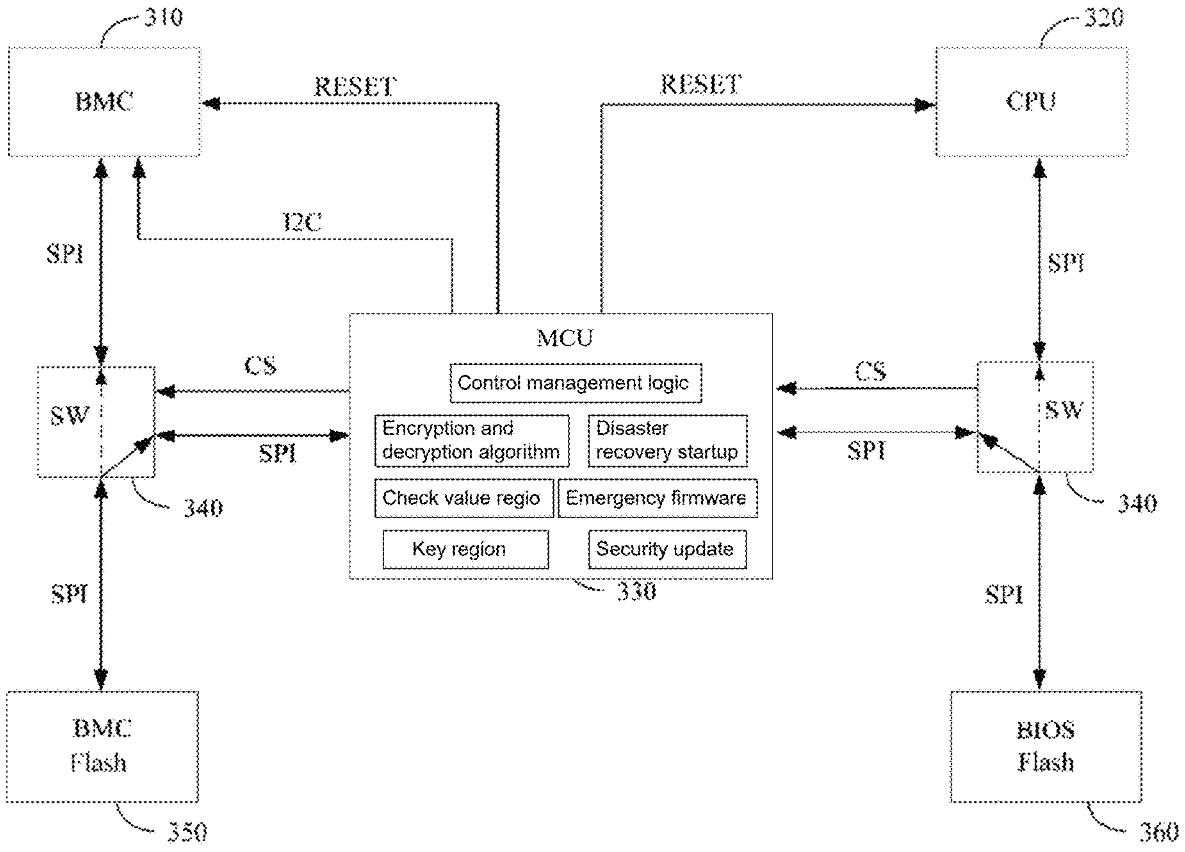
FIG. 3 is a third schematic structural diagram of a server startup management system provided according to embodiments of the present disclosure.

Referring to FIG. 3, FIG. 3 is a schematic diagram of a server startup management system with a single Flash provided according to embodiments of the present disclosure, comprising a BMC 310, a CPU 320, an MCU 330, an SW 340, a BMC Flash 350, and a BIOS Flash 360.

The SPI is a main channel for realizing data communication, for example, the BMC is connected to a Flash by means of an SPI bus, and can read a program from the Flash for startup, and can also store data into the Flash. The MCU is connected to a Flash by means of an SPI bus, and can read data for integrity and legitimacy check.

CS signal: the chip select signal is used to control an SPI bus connection mode of a gate. For example, CS0 is used by the BMC to control the gate for switching and selecting the connection relationship between the BMC and the two Flashes of the BMC. CS1 is used by the MCU to control the gate for switching and selecting the connection relationship between the MCU and the Flash.

The I2C bus is configured for communication between the BMC and the MCU. For example, when the firmware is updated by means of the BMC, the BMC needs to notify the MCU by means of the I2C bus, and the MCU needs to verify the legitimacy of the firmware, so as to implement security update of the firmware.

The present disclosure breaks the mechanism of performing integrity and security verification on the basis of a BMC in the past, and uses a third-party physical MCU, firmware of which cannot be updated, to perform integrity and security verification. Furthermore, the startup of the BMC and the CPU is clamped at the first time, and after the security of the firmware of the BMC and the CPU is confirmed, these modules are allowed to run, so that the risk of the BMC and BIOS firmware being illegitimately and maliciously modified or replaced is completely avoided physically.

Furthermore, the MCU can also destroy identified illegitimate malicious firmware, and provides the functions of disaster recovery startup and emergency firmware, which are configured for emergency startup of a server and automatic recovery (quick self-healing) of a legitimate secure firmware, reducing manual maintenance time, reducing the effect on services and reducing maintenance costs.

Figure 4:
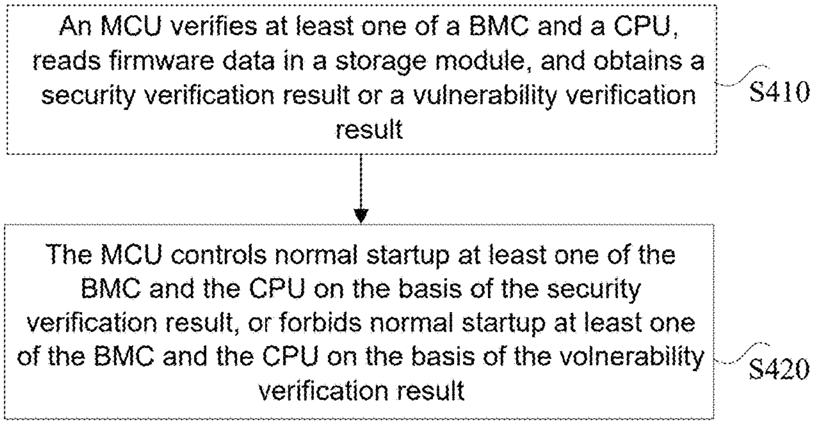
FIG. 4 is a first schematic flowchart of a server startup management method provided according to embodiments of the present disclosure.

Referring to FIG. 4, the server startup management method provided according to embodiments of the present disclosure comprises the following steps:

step 410: an MCU verifies at least one of a BMC and a CPU, reads firmware data in a storage module, and obtains a security verification result or a vulnerability verification result; and step 420: the MCU controls normal startup at least one of the BMC and the CPU on the basis of the security verification result, or forbids normal startup at least one of the BMC and the CPU on the basis of the vulnerability verification result.

In some embodiments, the MCU in the present embodiment, i.e. a microcontroller unit, is configured to implement a server startup management system. The main functions may comprise: the function of clamping startup of the BMC and the CPU, and preventing malicious software from starting up and running. The function of verifying the integrity and security of data in a Flash; a security key function; and the security key being burned with firmware and locked, so that an MCU program cannot be modified. A firmware self-healing function for providing disaster recovery startup and emergency firmware; clearing illegitimate firmware, security upgrade, and other functions.

The BMC is a central hub for entire-system monitoring, management and external interaction in a server system, and is an indispensable bridgehead in the server. The BMC has great authority and has a significant effect on the entire system, and thus the security of firmware thereof is becoming more important. Once the BMC is hacked or malicious software is run, the entire server can be hijacked and controlled.

The CPU, i.e. the central processing unit module, is a core computing unit for running an operating system and customer services.

The storage module, i.e. a storage chip, is mainly used for storing firmware data of the BMC or a BIOS (Basic Input Output System), and may use a Flash chip. In practical applications, a single Flash or dual Flashes may be used.

In step 410 above, the MCU performs encryption and decryption calculation on the data in the storage module Flash according to a set encryption and decryption algorithm and an unmodifiable security key stored in a key region, to obtain a security check value. Then, the obtained security check value is compared with a security check value stored in the storage module Flash. If they match, it indicates that the data is complete, and a security verification result is generated. If they do not match, it indicates that the firmware is damaged or tampered with, and has a security vulnerability, and a vulnerability verification result is generated.

In step 420 above, the MCU controls normal startup at least one of the BMC and the CPU on the basis of the security verification result, or prohibits normal startup at least one of the BMC and the CPU on the basis of the vulnerability verification result.

According to the server startup management system provided in some embodiments of the present disclosure, an MCU verifies at least one of a BMC and a CPU, reads firmware data in a storage module, and obtains a security verification result or a vulnerability verification result; and the MCU clamps normal startup at least one of the BMC and the CPU on the basis of the security verification result, or prohibits normal startup at least one of the BMC and the CPU on the basis of the vulnerability verification result. In the present disclosure, the startup of the BMC and the CPU is clamped by means of the MCU, and the secure startup of a server is realized by means of security verification, thereby ensuring the normal operation of a computer system and the security of a server system.

In some embodiments, the storage module comprises first storage firmware and second storage firmware; and the method further comprises:

firmware data of the first storage firmware and firmware data of the second storage firmware are read;

it is determined that a verification result corresponding to the first storage firmware is the security verification result, and it is determined that the first storage firmware is secure firmware, or it is determined that a verification result corresponding to the second storage firmware is the security verification result, and it is determined that the second storage firmware is secure firmware;

it is determined that the verification result corresponding to the second storage firmware is the vulnerability verification result, and it is determined that the second storage firmware is vulnerable firmware, or it is determined that the verification result corresponding to the first storage firmware is the vulnerability verification result, and it is determined that the first storage firmware is vulnerable firmware; and the secure firmware is synchronized into the vulnerable firmware.

It can be understood that when the storage module uses dual Flashes, the storage module may be divided into first storage firmware denoted as Flash0, and second storage firmware denoted as Flash1. Compared with a single Flash, the dual Flashes have a slightly more complicated design and higher security, so that after firmware in one Flash is damaged, another Flash can be used for backup.

In some embodiments, the MCU reads firmware data in the first storage firmware and the second storage firmware of the dual Flashes of the storage module, and if one firmware is secure, that is, the check result is a security verification result, and the other has a vulnerable check result, then synchronizes the secure firmware into the firmware which fails to pass the check.

In some embodiments, the method further comprises:

in cases where the verification results corresponding to the first storage firmware and the second storage firmware are both the vulnerability verification result, whether a disaster recovery startup option is set is determined;

in cases where disaster recovery startup is not set, clamping of Reset signals on Reset pins of the BMC and the CPU is maintained, and a system log is recorded and a buzzer alarm is given;

in cases where disaster recovery startup is set, the first storage firmware corresponding to the BMC and the second storage firmware corresponding to the CPU are cleared; and emergency startup firmware is refreshed into the first storage firmware or the second storage firmware, such that the BMC or the CPU starts up the emergency startup firmware.

In the present embodiment, when neither the verification result of the first storage firmware Flash0 nor the verification result of the second storage firmware Flash1 is passed, that is, the verification results are both the vulnerability verification result, the MCU needs to determine whether a disaster recovery startup option is set in the system.

If the disaster recovery startup function is not enabled, the MCU maintains clamping of the reset signals of the BMC and the CPU, not allowing the system to start up, and records a log and gives a buzzer alarm at the same time.

If the disaster recovery startup function is set, the MCU clears the firmware data in the Flash of the BMC, and then refreshes the emergency startup firmware in the MCU into the Flash, such that the BMC starts up the emergency firmware.

After the security emergency firmware is started up, the latest BMC firmware is downloaded from a specified address, and the MCU assists in verifying the security of the firmware, and after the security is confirmed, the BMC refreshes the Flash again. The MCU is notified after the update is completed.

By the same reasoning, when the BIOS firmware of the CPU fails to pass the verification, the MCU notifies the CPU to perform a security update on the BIOS firmware. The CPU downloads the corresponding BIOS firmware from a specified address, and verifies and updates the BIOS firmware, and the MCU continues to perform the process after the update is completed. Otherwise, the CPU is always clamped to prohibit startup thereof. After the BIOS firmware is verified or updated successfully, the MCU releases the Reset signal of the CPU, such that the CPU starts up securely.

It should be noted that during normal operation of the system, the MCU assists the BMC in performing a firmware security upgrade operation. The BMC sends information to the MCU to verify an upgrade package. The verification result is fed back to the BMC, and the BMC determines, according to the verification result, whether to update the firmware.

In some embodiments, before the MCU verifies at least one of the BMC and the CPU, the method further comprises:

after a server is powered on, the Reset pins of the BMC and the CPU are clamped on the basis of the Reset signals, and the BMC and the CPU are prevented from starting up.

In some embodiments, the MCU controlling normal startup at least one of the BMC and the CPU on the basis of the security verification result comprises:

the security verification result is obtained after firmware check or update of the BMC and the CPU is successful; and the Reset pins of the BMC and the CPU are released on the basis of the security verification result, such that the BMC and the CPU start up normally.

In some embodiments, before performing firmware data check, the MCU in the present embodiment is powered on first, and clamps the startup of the MCU and the CPU by pulling down the Reset pins thereof. In this case, the MCU performs integrity and security check on the firmware of the BMC and the BIOS. After the verification succeeds, the MCU releases the corresponding Reset signals, such that the MCU and the CPU start to load firmware from the Flash for startup.

A security verification result is obtained after firmware check or update of the BMC and the CPU is successful, and the Reset pins of the BMC and the CPU are released on the basis of the security verification result, such that the BMC and the CPU start up normally.

Figure 5:
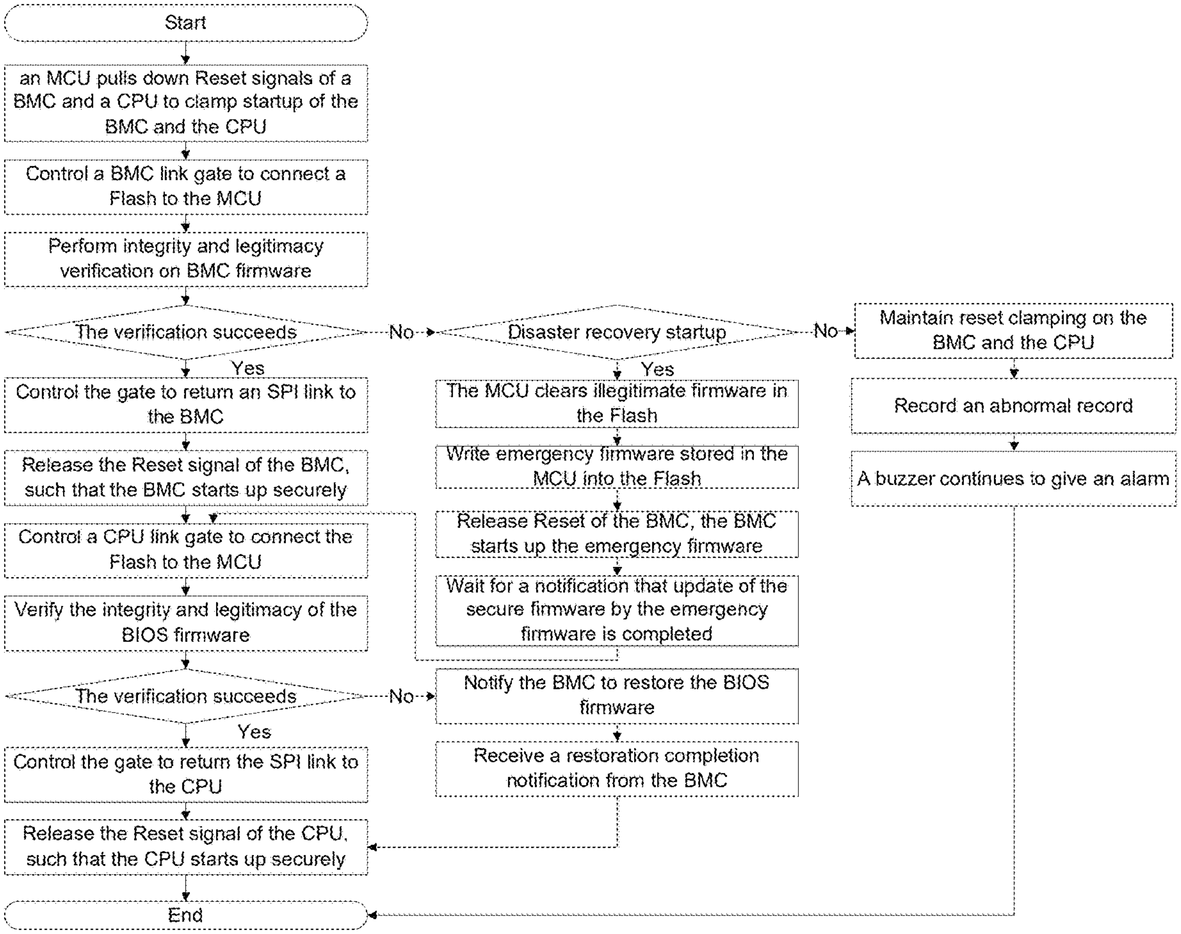
FIG. 5 is a second schematic flowchart of a server startup management method provided according to embodiments of the present disclosure.

Referring to FIG. 5, FIG. 5 is a processing flowchart of a server startup management method involving a single Flash.

After the flow starts, an MCU pulls down Reset signals of a BMC and a CPU to clamp startup of the BMC and the CPU, controls a BMC link gate to connect a Flash to the MCU, and performs integrity and legitimacy verification on BMC firmware, which can be recorded as a first verification.

When the first verification succeeds, the gate is controlled to return an SPI link to the BMC; the Reset signal of the BMC is released, such that the BMC starts up securely; a CPU link gate is controlled to connect the Flash to the MCU; and the integrity and legitimacy of the BIOS firmware are verified, which can be recorded as a second verification.

When the first verification fails, it is determined whether disaster recovery startup is set. In cases where disaster recovery startup is set, the MCU clears illegitimate firmware in the Flash; emergency firmware stored in the MCU is written into the Flash; Reset of the BMC is released; and the BMC starts up the emergency firmware, waits for a notification that update of the secure firmware by the emergency firmware is completed, and returns to the step of controlling the CPU link gate to connect the Flash to the MCU. In cases where disaster recovery startup is not set, reset clamping on the BMC and the CPU is maintained, an abnormal record is recorded, and a buzzer continues to give an alarm until the process ends.

When the second verification succeeds, the gate is controlled to return the SPI link to the CPU, and the Reset signal of the CPU is released, such that the CPU starts up securely until the process ends.

When the second verification fails, the BMC is notified to restore the BIOS firmware, and upon receipt of a restoration completion notification from the BMC, the step of releasing the Reset signal of the CPU so as to enable the CPU to start up securely is returned to.

Figure 6:
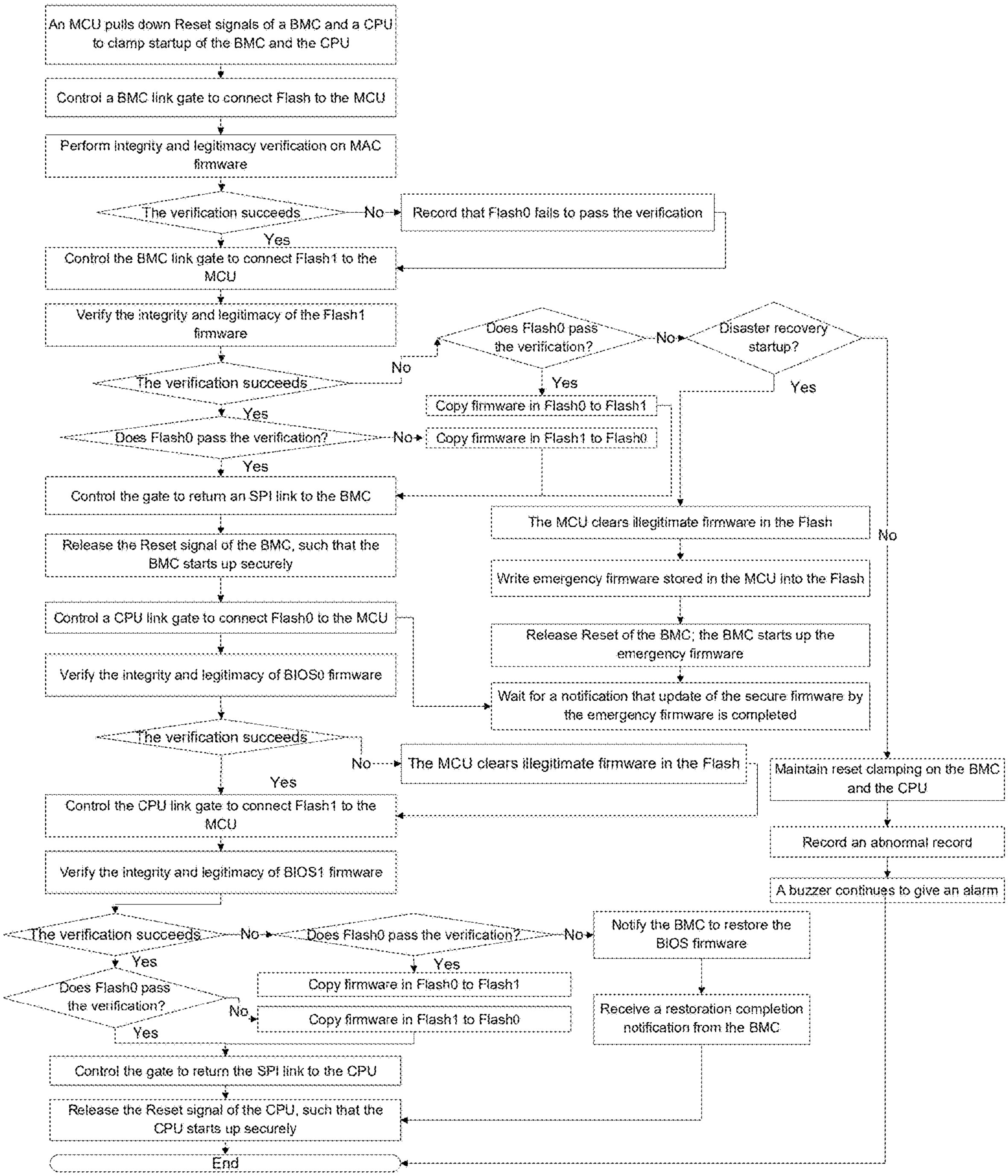
FIG. 6 is a third schematic flowchart of a server startup management method provided according to embodiments of the present disclosure.

Referring to FIG. 6, FIG. 6 is a processing flowchart of a server startup management method involving dual Flashes.

After the flow starts, an MCU pulls down Reset signals of a BMC and a CPU to clamp startup of the BMC and the CPU, controls a BMC link gate to connect Flash0 to the MCU, and performs integrity and legitimacy verification on Flash0 firmware, which can be recorded as a first verification.

When the first authentication succeeds, the BMC link gate is controlled to connect Flash1 to the MCU, and the integrity and legitimacy of the Flash1 firmware are verified, which can be recorded as a second authentication. When the first verification fails, it is recorded that Flash0 fails to pass the verification.

When the second verification succeeds, it is determined whether Flash0 has passed the verification. In cases where Flash0 fails to pass the verification, firmware in Flash1 is copied to Flash0. In cases where Flash0 has passed the verification, the gate is controlled to return an SPI link to the BMC; the Reset signal of the BMC is released, such that the BMC starts up securely; a CPU link gate is controlled to connect Flash0 to the MCU; and the integrity and legitimacy of the BIOS firmware are verified, which can be recorded as a third verification.

When the second authentication fails, it is verified whether Flash0 has passed the verification. In cases where Flash0 has passed the verification, firmware in Flash0 is copied to Flash1. In cases where Flash0 fails to pass the verification, it is determined whether disaster recovery startup is set. In cases where disaster recovery startup is set, the MCU clears illegitimate firmware in the Flash; emergency firmware stored in the MCU is written into the Flash; Reset of the BMC is released; and the BMC starts up the emergency firmware, and waits for a notification that update of the secure firmware by the emergency firmware is completed. In cases where disaster recovery startup is not set, reset clamping on the BMC and the CPU is maintained, an abnormal record is recorded, and a buzzer continues to give an alarm until the process ends.

When the third verification succeeds, it is verified whether Flash0 has passed the verification. In cases where Flash0 has passed the verification, the gate is controlled to return the SPI link to the CPU, and the Reset signal of the CPU is released, such that the CPU starts up securely until the process ends. In cases where Flash0 fails to pass the verification, firmware in Flash1 is copied to Flash0.

In cases where the third verification fails, it is verified whether Flash0 has passed the verification. In cases where Flash0 has passed the verification, firmware in Flash0 is copied to Flash1. In cases where Flash0 fails to pass the verification, the BMC is notified to restore the BIOS firmware, and upon receipt of a restoration completion notification from the BMC, the step of releasing the Reset signal of the CPU so as to enable the CPU to start up securely is returned to.

Figure 7:
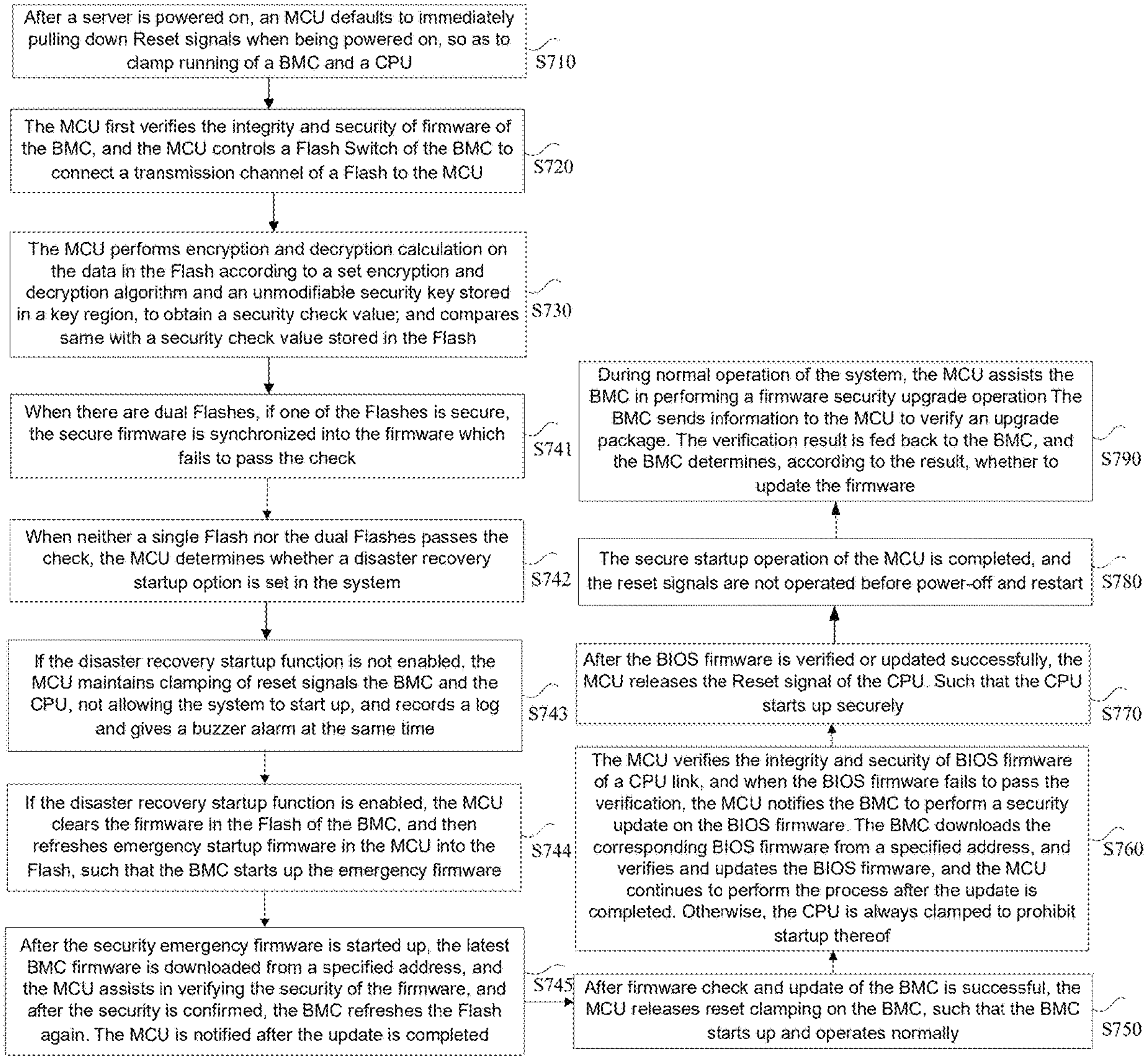
FIG. 7 is a fourth schematic flowchart of a server startup management method provided according to embodiments of the present disclosure.

Referring to FIG. 7, a complete flowchart of the server startup management method provided according to embodiments of the present disclosure comprises:

step 710: after a server is powered on, an MCU defaults to immediately pulling down Reset signals when being powered on, so as to clamp running of a BMC and a CPU.

Step 720: the MCU first verifies the integrity and security of firmware of the BMC, and the MCU controls a Flash Switch of the BMC to connect a transmission channel of a Flash to the MCU (in this way, the MCU can read and operate data of the Flash).

Step 730: the MCU performs encryption and decryption calculation on the data in the Flash according to a set encryption and decryption algorithm and an unmodifiable security key stored in a key region, to obtain a security check value; and compares same with a security check value stored in the Flash. If they match, it indicates that the data is complete. If they do not match, it indicates that the firmware is damaged or tampered with, and has a security vulnerability.

If the check fails, there are several processing methods:

step 741: when there are dual Flashes, if one of the Flashes is secure, the secure firmware is synchronized into the firmware which fails to pass the check.

Step 742: when neither a single Flash nor the dual Flashes passes the check, the MCU determines whether a disaster recovery startup option is set in the system.

Step 743: if the disaster recovery startup function is not enabled, the MCU maintains clamping of the reset signals the BMC and the CPU, not allowing the system to start up, and records a log and gives a buzzer alarm at the same time.

Step 744: if the disaster recovery startup function is enabled, the MCU clears the firmware in the Flash of the BMC, and then refreshes emergency startup firmware in the MCU into the Flash, such that the BMC starts up the emergency firmware.

Step 745: after the security emergency firmware is started up, the latest BMC firmware is downloaded from a specified address, and the MCU assists in verifying the security of the firmware, and after the security is confirmed, the BMC refreshes the Flash again. The MCU is notified after the update is completed.

Step 750: after firmware check and update of the BMC is successful, the MCU releases reset clamping on the BMC, such that the BMC starts up and operates normally.

Step 760: the MCU verifies the integrity and security of BIOS firmware of a CPU link, and when the BIOS firmware fails to pass the verification, the MCU notifies the BMC to perform a security update on the BIOS firmware. The BMC downloads the corresponding BIOS firmware from a specified address, and verifies and updates the BIOS firmware, and the MCU continues to perform the process after the update is completed. Otherwise, the CPU is always clamped to prohibit startup thereof.

Step 770: after the BIOS firmware is verified or updated successfully, the MCU releases the Reset signal of the CPU. Such that the CPU starts up securely.

Step 780: the secure startup operation of the MCU is completed, and the reset signals are not operated before power-off and restart.

Step 790: during normal operation of the system, the MCU assists the BMC in performing a firmware security upgrade operation. The BMC sends information to the MCU to verify an upgrade package. The verification result is fed back to the BMC, and the BMC determines, according to the result, whether to update the firmware.

Figure 8:
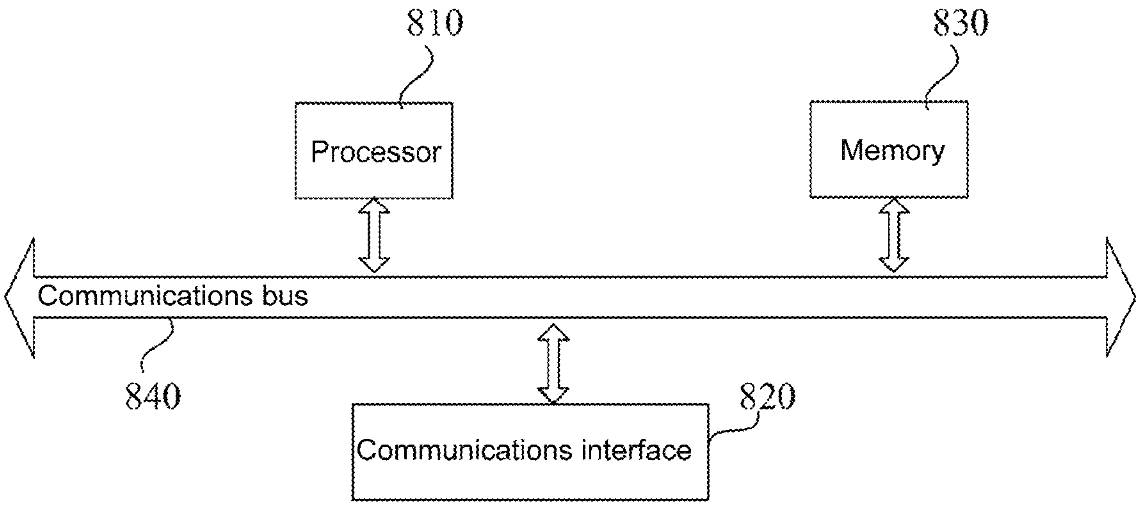
FIG. 8 is a schematic structural diagram of an electronic device provided according to embodiments of the present disclosure.

FIG. 8 illustrates a physical schematic structural diagram of an electronic device. As shown in FIG. 8, the electronic device may comprise: a processor 810, a communications interface 820, a memory 830, and a communications bus 840. The processor 810, the communications interface 820 and the memory 830 complete communication with each other by means of the communications bus 840. The processor 810 can invoke a logic instruction in the memory 830 to execute a server startup management method. The method comprises:

an MCU verifies at least one of a BMC and a CPU, reads firmware data in a storage module, and obtains a security verification result and a vulnerability verification result; and the MCU controls normal startup at least one of the BMC and the CPU on the basis of the security verification result, or prohibits normal startup at least one of the BMC and the CPU on the basis of the vulnerability verification result.

Furthermore, the logic instruction in the memory 830 can be implemented in the form of software functional units and sold or used as an independent product, it may be stored in a non-transitory readable storage medium. On the basis of such understanding, the part of the technical solutions of the present disclosure that contributes in essence or to the related art or part of the technical solutions may be embodied in the form of a software product. The computer software product is stored in a non-transitory readable storage medium, and comprises several instructions to enable a computer device (which may be a personal computer, a server or a network device) to execute all or some of the steps of the method described in the embodiments of the present disclosure. Moreover, the described non-transitory readable storage medium comprises: media such as a USB flash disk, a mobile hard disk, a read-only memory (ROM), a random access memory (RAM), a magnetic disk or an optical disc which can store program codes.

In another aspect, some embodiments of the present disclosure further provide a computer program product. The computer program product comprises a computer program. The computer program may be stored in a non-transitory readable storage medium. When the computer program is executed by a processor, a computer can execute the server startup management method provided according to the embodiments above. The method comprises:

- an MCU verifies at least one of a BMC and a CPU, reads firmware data in a storage module, and obtains a security verification result and a vulnerability verification result; and
- the MCU controls normal startup at least one of the BMC and the CPU on the basis of the security verification result, or prohibits normal startup at least one of the BMC and the CPU on the basis of the vulnerability verification result.

In still another aspect, some embodiments of the present disclosure further provide a non-transitory readable storage medium. The non-transitory readable storage medium stores a computer program which, when being executed by a processor, implements the server startup management method provided according to the embodiments above. The method comprises:

- an MCU verifies at least one of a BMC and a CPU, reads firmware data in a storage module, and obtains a security verification result and a vulnerability verification result; and
- the MCU controls normal startup at least one of the BMC and the CPU on the basis of the security verification result, or prohibits normal startup at least one of the BMC and the CPU on the basis of the vulnerability verification result.

The apparatus embodiments as described above are merely exemplary. The units described as separate components may or may not be physically separated, and the components displayed as units may or may not be physical modules, that is, may be located in one place, or may be distributed in a plurality of network units. Some or all of the modules may be selected according to actual needs to achieve the purpose of the solutions of the embodiments. A person of ordinary skill in the art would understand and implement the embodiments without any inventive effort.

From the description of the described embodiments, a person skilled in the art would have been able to clearly understand that the embodiments may be implemented by using software and necessary general hardware platforms, and of course may also be implemented using hardware. On the basis of such understanding, the part of the technical solutions that contributes in essence or to the related art may be embodied in the form of a software product. The computer software product may be stored in a computer non-transitory readable storage medium, such as an ROM/RAM, a magnetic disk and an optical disc, and comprises several instructions to enable a computer device (which may be a personnel computer, a server or a network device) to execute the method according to the embodiments or to some of the embodiments.

Finally, it should be noted that the embodiments above are only used to explain the technical solutions of the present disclosure, rather than limit same. Although the present disclosure has been explained in detail with reference to the embodiments above, a person of ordinary skill in the art would have understood: they still could modify the technical solutions disclosed in the embodiments above or make equivalent replacements to some of the technical features therein. However, these modifications or replacements shall not render that the nature of the corresponding technical solutions departs from the spirit and scope of the technical solutions in the embodiments of the present disclosure.

What is claimed is:

1. A server startup management system, comprising: a Micro-Controller Unit (MCU), a storage module, a Baseboard Management Controller (BMC) and a Central Processing Unit (CPU);

- the MCU is configured to control running and stopping of the BMC and the CPU, and the MCU verifies at least one of the BMC and the CPU, reads firmware data in the storage module, and obtains a security verification result or a vulnerability verification result;
- the storage module is configured to store firmware data of the BMC and firmware data of the CPU; and
- at least one of the BMC and the CPU is configured to start up normally on the basis of the security verification result of the MCU, or to prohibit startup on the basis of the vulnerability verification result of the MCU.

2. The server startup management system according to claim 1, wherein the storage module comprises first storage firmware and second storage firmware; and

- the first storage firmware is configured to store the firmware data of the BMC, and the second storage firmware is configured to store the firmware data of the CPU.

3. The server startup management system according to claim 2, wherein the MCU is configured to:

- read firmware data of the first storage firmware and firmware data of the second storage firmware;
- determine that a verification result corresponding to the first storage firmware is the security verification result, and determine that the first storage firmware is secure firmware, or determine that a verification result corresponding to the second storage firmware is the security verification result, and determine that the second storage firmware is secure firmware;
- determine that the verification result corresponding to the second storage firmware is the vulnerability verification result, and determine that the second storage firmware is vulnerable firmware, or determine that the verification result corresponding to the first storage firmware is the vulnerability verification result, and determine that the first storage firmware is vulnerable firmware; and
- synchronize the secure firmware into the vulnerable firmware.

4. The server startup management system according to claim 2, further comprising a gating module:

- the gating module is configured to control a connection between the MCU and the first storage firmware, or a connection between the MCU and the second storage firmware.

5. The server startup management system according to claim 4, wherein the gating module comprises a dual control port; and

- the gating module is configured to, on the basis of a switching logic, enable the MCU to be connected to the first storage firmware and the second storage firmware through the dual control port.

6. The server startup management system according to claim 2, wherein the BMC is connected to the first storage firmware or the second storage firmware on the basis of a Serial Peripheral Interface (SPI) bus, and the MCU is connected to the first storage firmware or the second storage firmware on the basis of the SPI bus.

7. The server startup management system according to claim 2, wherein the BMC switches, on the basis of a first Chip Select (CS) signal, connection between the BMC and the first storage firmware or the second storage firmware; and the MCU switches, on the basis of a second Chip Select (CS) signal, a connection between the MCU and the first storage firmware, or a connection between the MCU and the second storage firmware.

8. The server startup management system according to claim 2, wherein the MCU is further configured to:

after a server is powered on, clamp Reset pins of the BMC and the CPU on the basis of Reset signals, and prevent the BMC and the CPU from starting up;

obtain the security verification result after firmware check or update of the BMC and the CPU is successful; and release the Reset pins of the BMC and the CPU on the basis of the security verification result, such that the BMC and the CPU start up normally.

9. The server startup management system according to claim 8, wherein the MCU is further configured to:

in cases where verification results corresponding to the first storage firmware and the second storage firmware are both the vulnerability verification result, determine whether a disaster recovery startup option is set; and in cases where the disaster recovery startup is not set, maintain clamping of the Reset signals on the Reset pins of the BMC and the CPU, and record a system log and give a buzzer alarm.

10. The server startup management system according to claim 3, wherein the MCU is further configured to:

in cases where the disaster recovery startup is set, clear the first storage firmware corresponding to the BMC and the second storage firmware corresponding to the CPU; and refresh emergency startup firmware into the first storage firmware or the second storage firmware, such that the BMC or the CPU starts up the emergency startup firmware.

11. The server startup management system according to claim 10, wherein the MCU or the CPU is further configured to:

after the emergency startup firmware is started up, download new BMC firmware or new CPU firmware from a target address, such that the MCU determines security of the BMC firmware or the CPU firmware; and upon determining that the BMC firmware or the CPU firmware is secure, refresh the first storage firmware or the second storage firmware, obtain an update completion notification and send same to the MCU.

12. The server startup management system according to claim 11, wherein the MCU receives the update completion notification of the BMC or the CPU on the basis of an Inter-Integrated Circuit (I2C) bus.

13. The server startup management system according to claim 1, wherein the MCU is configured to: on the basis of a set encryption and decryption algorithm and an unmodifiable security key stored in a key region, perform encryption and decryption calculation on the firmware data of the storage module to obtain a security check value, and compare calculated security check value with a security check value stored in the storage module to obtain a matching result; in a case that the matching is successful, generate the security verification result; and in a case that the matching is unsuccessful, generate the vulnerability verification result.

14. The server startup management system according to claim 1, wherein the MCU is further configured to: enable a program of the MCU to be unmodifiable by means of a security key obtained through firmware burning; and destroy illegitimate malicious firmware, and perform emergency startup of the server on the basis of disaster recovery startup, and perform automatic recovery of legitimate secure firmware on the basis of emergency firmware.

15. The server startup management system according to claim 1, wherein the MCU is further configured to: perform a first verification on integrity and legitimacy of the BMC, in a case that the first verification is successful, release Reset signal of the BMC, such that the BMC starts up securely, control a CPU link gate to connect a Flash to the MCU, and perform a second verification on integrality and legitimacy of Basic Input Output System (BIOS) firmware, in a case of the second verification is failed, notify the BMC to restore the BIOS firmware, and in a case that restoration of the BIOS firmware is completed, enable the CPU to start up securely.

16. A server startup management method implemented on the basis of the server startup management system according to claim 1, comprising:

verifying, by an MCU, at least one of a BMC and a CPU, reading firmware data in a storage module, and obtaining a security verification result or a vulnerability verification result; and controlling, by the MCU, normal startup at least one of the BMC and the CPU on the basis of the security verification result, or prohibiting normal startup at least one of the BMC and the CPU on the basis of the vulnerability verification result.

17. The server startup management method according to claim 16, wherein the storage module comprises first storage firmware and second storage firmware; and the method further comprises:

reading firmware data of the first storage firmware and firmware data of the second storage firmware;

determining that a verification result corresponding to the first storage firmware is the security verification result, and determining that the first storage firmware is secure firmware, or determining that a verification result corresponding to the second storage firmware is the security verification result, and determine that the second storage firmware is secure firmware;

determining that the verification result corresponding to the second storage firmware is the vulnerability verification result, and determining that the second storage firmware is vulnerable firmware, or determining that the verification result corresponding to the first storage firmware is the vulnerability verification result, and determine that the first storage firmware is vulnerable firmware; and synchronizing the secure firmware into the vulnerable firmware.

18. The server startup management method according to claim 17, further comprising:

in cases where the verification results corresponding to the first storage firmware and the second storage firmware are both the vulnerability verification result, determining whether a disaster recovery startup option is set;

in cases where the disaster recovery startup is not set, maintaining clamping of Reset signals on Reset pins of the BMC and the CPU, and recording a system log and giving a buzzer alarm;

in cases where the disaster recovery startup is set, clearing the first storage firmware corresponding to the BMC and the second storage firmware corresponding to the CPU; and refreshing emergency startup firmware into the first storage firmware or the second storage firmware, such that the BMC or the CPU starts up the emergency startup firmware.

19. The server startup management method according to claim 16, wherein before the MCU verifies at least one of the BMC and the CPU, the method further comprises:

after a server is powered on, clamping the Reset pins of the BMC and the CPU on the basis of the Reset signals, and preventing the BMC and the CPU from starting up.

20. The server startup management method according to claim 16, wherein the MCU controlling normal startup at least one of the BMC and the CPU on the basis of the security verification result comprises:

obtaining the security verification result after firmware check or update of the BMC and the CPU is successful; and releasing the Reset pins of the BMC and the CPU on the basis of the security verification result, such that the BMC and the CPU start up normally.

* * * * *